Figures 1, 2:
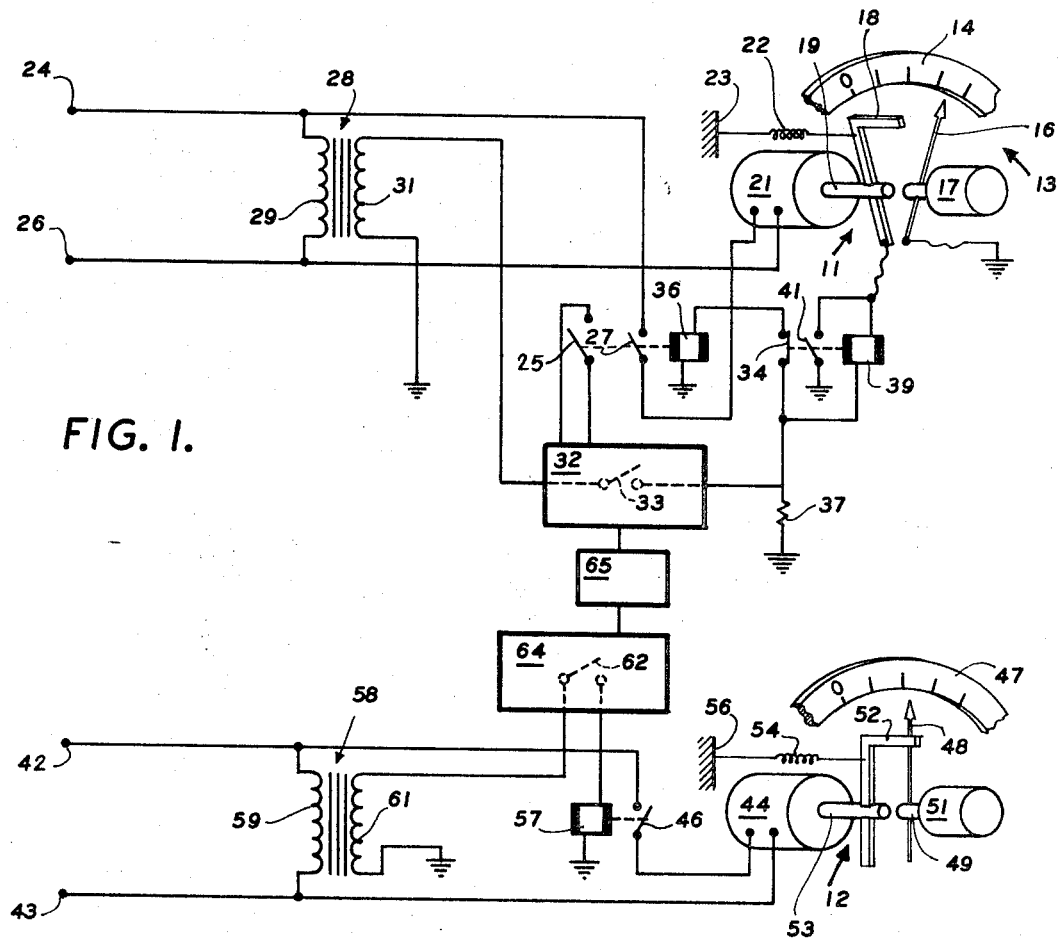

United States Patent

[11] 3,594,743

| [72] | Inventor | George D. Rhoades<br>La Grange Park, Ill. |
|---|---|---|
| [21] | Appl. No. | 678,610 |
| [22] | Filed | Oct. 27, 1967 |
| [45] | Patented | July 20, 1971 |
| [73] | Assignee | Liquid Carbonic Corporation<br>Chicago, Ill. |

[54] APPARATUS FOR READING THE POSITION OF AN INDICATOR
5 Claims, 2 Drawing Figs.

| [52] | U.S. Cl. | 340/203, 340/151 |
|---|---|---|
| [51] | Int. Cl. | G08c 19/16 |
| [50] | Field of Search | 340/177, 203, 151 |

[56] References Cited
UNITED STATES PATENTS

| 1,996,677 | 4/1935 | Leeson et al. | 340/151 |
|---|---|---|---|
| 2,321,971 | 6/1943 | Becker | 340/203 |
| 2,708,745 | 5/1955 | Chappell et al. | 340/203 |
| 3,266,018 | 8/1966 | Higgins | 340/151 |

*Primary Examiner*—John W. Caldwell
*Assistant Examiner*—Glen R. Swann, III
*Attorney*—Anderson, Luedeka, Fitch, Even & Tabin ABSTRACT: Apparatus is described for reading the position of an indicator. Scanning means, at the location of the indicator, and readout means are both operable at the same time in response to a read signal. Means are provided for terminating operation of the readout means in a readout position in response to arrival of the scanning means at an indicating position corresponding to the position of the indicator.

PATENTED JUL 20 1971

3,594,743

INVENTOR
GEORGE D. RHOADES

BY Anderson, Luedeka, Fitch, Even, & Tabin
ATTORNEYS

APPARATUS FOR READING THE POSITION OF AN INDICATOR

This invention relates to the automated reading of meters and similar devices. More particularly, the invention relates to apparatus for reading the position of a moveable indicator on such a device.

Meters and similar devices, for indicating such things as liquid levels, pressures, and amounts of electricity or gas used, generally incorporate a moveable indicator. The moveable indicator may be a needle or pointer, or some other type of member such as a damper or valve stem, and is positioned by the device in a manner that will indicate the particular thing being measured. Where meters and similar devices are used at remote locations, it is often necessary for personnel to visit such locations and observe the position of the indicator. This may be expensive and time consuming.

Apparatus has heretofore been devised for reading the position of an indicator at a remote location. Such apparatus, however, has generally tended to be too expensive for widespread use. Moreover, such apparatus has heretofore been highly complex and unreliable.

Accordingly, it is an object of this invention to provide improved apparatus for reading the position of an indicator.

Another object of the invention is to provide indicator reading apparatus which is low in cost and simple of construction.

A further object of the invention is to provide indicator reading apparatus which is reliable and which is accurate in operation.

Other objects of the invention will be apparent to those skilled in the art from the following description taken in connection with the accompanying drawings wherein:

FIG. 1 is a schematic diagram, partially mechanical and partially electrical, of apparatus constructed in accordance with the invention; and FIG. 2 is a schematic mechanical diagram of a portion of an alternative embodiment of the invention.

Very generally, the apparatus of the invention comprises scanning means 11 adapted to be positioned at the indicator location and being operable in response to a read signal to move from a reference position to an indication position corresponding to the position of the indicator. Readout means 12 are also provided adapted to be positioned at a reading location and being operable in response to the read signal to move from a reference position. Means are provided in a readout position in response to arrival of the scanning means at the indicating position.

Referring now more particularly to FIG. 1, the illustrated apparatus is for reading a meter 13 positioned at a remote location, and utilizes equipment presently available from companies of the Bell Telephone System under the registered trademark "DATA-phone." The meter 13 includes a dial 14 with suitable markings thereon, a pointer or indicator 16, and a suitable drive 17 for the indicator 16. The drive 17 may be of any convenient construction depending upon the particular thing being metered.

The scanning means 11 operates to sense the position of the indicator 16. The scanning means include a moveable contact 18 attached to the drive shaft 19 of a synchronous motor 21. A tension spring 22 having one end fixed at 23 has its free end secured to the contact 18. When the motor 21 is energized, the contact moves toward the indicator 16 against the bias of the spring 22.

Energizing and control circuitry for the motor 21 are provided. Power for such circuitry is derived across the terminals 24 and 26 of a suitable AC source, not illustrated. The terminal 24 is connected to the motor 21 through a relay switch 27, the operation of which is described below. The terminal 26 is connected directly to the motor. With the switch 27 closed, the motor 21 is connected across the terminals 24 and 26 and is thereby energized.

A transformer 28 is also provided having a primary winding 29 connected across the terminals 24 and 26. The secondary winding 31 of the transformer 28 has one end grounded and the other end connected to the "DATA-phone" transmitter unit 32. In the transmitter unit 32, the ungrounded end of the winding 31 is connected to a read signal switch 33. The other side of the switch 33 is connected through a relay switch 34 to a relay 36. The relay switch 34 is normally closed and is operated in a manner which will be subsequently described. The read signal switch 33, which is part of the transmitter unit 32, is normally open and is closed, when it is desired to read the position of the indicator 16, by dialing the proper telephone number of a telephone circuit (not illustrated) associated with the transmitter unit 32. A resistance heater 37 is connected between the switch 33 and ground. After a predetermined delay, the heater operates a switch, not illustrated, in the telephone circuit associated with the transmitter 32 to thereby effect a delayed telephone disconnection of the unit 32 and thereby open the switch 33, as is know in the art.

The ungrounded end of the secondary winding 31 of the transformer 28 is also connected through the read signal switch 33 to a relay 39. The opposite end of the coil of the relay 39 is connected to the moveable contact 18 and is also connected through a normally open relay switch 41 to a ground. The indicator 16 is also grounded.

At the reading location, a pair of AC power terminals 42 and 43 are provided connected across a suitable AC source not illustrated. The source across which the terminals 42 and 43 are connected is of the same frequency as the source across which the terminal 24 and 26 are connected and may, for example, be a conventional 60 cycle AC source.

The readout means 12 at the reading location include a synchronous motor 44 which is connected across the terminals 42 and 43 through a normally open relay switch 46. The readout means also include a dial 47 with markings thereon proportional to the markings on the dial 14 in the meter 13. An indicator or needle 48 is also provided which rotates on a shaft 49. A suitable reset device 51, such as a manually operable knob, is secured to the shaft 49 in order to reset the indicator 48 at the zero position when a new reading is to be taken. The reading means 12 also include a moveable arm 52 which is driven by the motor 44 through the motor drive shaft 53. A tension spring 54 biases the arm 52 against rotation with respect to a fixed end 56 of the spring.

Upon energization of the motor 44, through closure of the switch 46, the contact 52 will move against the bias of the spring 54 to displace the indicator 48. The relay switch 46 is controlled by a relay 57. The relay 57 is energized through a transformer 58, the latter having a primary winding 59 connected across the terminals 42 and 43 and a secondary winding 61. The relay 57 is connected through a switch 62 across the secondary winding 61. The switch 62 is a normally open switch and is part of a "DATA-phone" receiver unit 64 which is interconnected with the transmitter unit through a suitable telephone circuit 65. The switch 62 is closed by a signal from the transmitter unit 32 sent in response to closure of the switch 25, to which the transmitter unit 32 is connected. The switch 62 opens upon a further signal from the transmitter sent in response to opening of the switch 25.

The operation of the apparatus will now be described in detail. When a reading is to be taken, the appropriate telephone number is dialed and, upon connection, the read signal switch 33 closes. The relay 36 is thereby energized through the normally closed relay switch 34. Energization of the relay 36 closes the normally open switch 25 and the transmitter 32 signals the receiver 64 to close the switch 62.

Closure of the normally open relay switch 27 initiates operation of the scanning means 11 by energizing the motor 21 thereof. The contact 18 is thereby moved against the bias of the spring 22 until it comes in contact with the indicator 16. Upon contacting the indicator 16, which is grounded, the relay 39 is connected across the secondary winding 31. Energization of the relay 39 is locked in by closure of the normally open switch 41, maintaining an energizing circuit through the relay 39.

Energization of the relay 39 also operates to open the normally closed relay switch 34. This deenergizes the relay 36, causing the relay switch 27 to open, thus deenergizing the motor 21. The motor 21 is of the type having a self-contained electrically actuated clutch connected in parallel with the motor windings. Such motors are available commercially. When the motor is deenergized, the self-contained clutch disengages, thereby permitting the spring 22 to return the contact 18 to its original position.

At the time the relay switch 27 is closed to energize the scanning means 11, the switch 62, as mentioned above, is also closed to energize the readout means 12. Closure of the switch 62 energizes the relay 57 and closes the normally open relay switch 46. Closure of the relay switch 46 energizes the motor 44 and moves the contact 52 and hence the indicator 48. Upon energization of the relay 39 as previously described (i.e., the contact 18 engaging the indicator 16) the relay 36 is deenergized, causing the switch 25 to open. The transmitter 32 then signals the receiver 64 to open the switch 62. Opening of the switch 62 deenergizes the relay 57 and hence deenergizes the motor 44. The motor 44 is of the identical self-contained clutch type as the motor 21 and hence, when the motor and its internal clutch are deenergized, the spring 54 returns the contact 52 to its original position. The indicator 48, however, is left at a position corresponding to the position of the indicator 16. Once this position is read, the indicator 48 may be returned to the zero position by the reset means 51.

Referring now to FIG. 2, a portion of an alternative embodiment of the invention is illustrated. The particular illustrated apparatus is for use with a device for indication liquid level. A float bar or arm 66 is coupled to a rotatably mounted shaft 67. A pointer 68 on an extension arm or indicator 69 indicates a particular liquid level on the face of a dial 71. The indicator 69 pivots about the axis of the shaft 67. A switch 73 having a switch actuator 74 and actuator arm 75 is attached to the underside of the indicator 69 and moves with the indicator. The switch 73 may be connected in series between the relay coil 39 and ground in the circuit of FIG. 1 in order to cause energization of the relay coil 39 when the switch actuator 74 is displaced.

The scanning means 11 in the embodiment of FIG. 2 include the motor 21 which, instead of driving a contact as was the case in FIG. 1, rotates a disc 76 carrying a pin 77 which is positioned so as to engage the actuator arm 75 incident to the rotation of the disc 76. Upon sufficient displacement of the pin 77, the actuator arm 75 is displaced and the switch 73 is closed. The time interval in which it takes the pin 77 to close the switch 73, as was the case in FIG. 1, corresponds to the time interval of the operation of a suitable readout means similar to the readout means 12 of FIG. 1.

In FIG. 1, connection is made between the scanning means 11 and the readout means 12 by means of telephone equipment 32, 64 and 65. Other scanning means identical to that shown may be coupled by telephone to the readout means to enable successive reading of a plurality of meters. In addition, a plurality of meters at one station may be serially read out by connecting the same through a sequencing device, such as a stepping relay, to a common transmitter unit. Moreover, in certain applications suitable connections may be made by other means than telephone equipment, such as a cable, radio or microwave. Suitable circuitry for accomplishing such information transfer may be designed in accordance with principles known to those skilled in the art.

It may therefore be seen that the invention provides improved apparatus for reading the position of an indicator. The apparatus utilizes a common synchronization for the scanning means and the readout means, and the scanning means and the readout means are suitably calibrated so that their readings are proportional.

Various modifications of the invention in addition to those shown and described herein will become apparent to those skilled in the art from the foregoing description and accompanying drawings. Such other modifications are intended to fall within the scope of the appended claims.

What I claim is:

1. A combination for use with a telephone system having a readout location and a plurality of remote locations and having a selecting means at said readout location for selecting one of said remote locations, each of said remote locations having thereat an indicator whose indicating position relative to a starting position is to be read, said combination comprising a first switch means which closes in response to said remote location being selected by said selecting means, a first power source at said remote location, a first drive motor at said remote location energized by said power source in response to the closing of said first switch means, means at said remote location including a second switch means for signaling back to said readout location, said means at said remote location being operable with closure of said first switch means and connection of said stations over said telephone system to generate a signal for transmission back over said connected telephone system to said readout location, a third switch means at said readout location operable in response to said signal back, a relay operable by said third switch means at said readout station, a second power source at said readout station, a second motor at said readout location energized by said second power source in response to the closing of said relay at said readout location, a first element at said remote location movable by said first drive motor from a starting position corresponding to said indicator starting position through an indicating position corresponding to the indicating position of said indicator, a second element at said readout location movable from a starting position corresponding to the starting position of said first element and movable by said second motor through a readout position corresponding to said indicating position of said first element, and fourth switch means at said remote location responsive to said first element reaching its indicating position to open said first and second switch means deenergizing said first driving motor and signaling back to said means at said readout location thereby deenergizing said second driving motor and stopping said second element in its readout position.

2. Apparatus according to claim 1 wherein both of said driving motors are synchronous motors driven by the same frequency alternating current.

3. Apparatus according to claim 2 wherein said first power source comprises a first alternating current power supply, said means at said remote location includes a fifth switch means at said remote location, and a telephone dial means at said readout location for closing said fifth switch means when said remote location is dialed, said first switch means is a first normally open contact, said second switch means is a second normally open contact, a second relay coil is provided at said remote location for closing said first and second contacts when energized, a third normally closed contact is provided in said fourth switch means at said remote location, a third relay coil is provided for opening said third contact when energized, said fifth switch means being coupled in series with said first power supply, said third contact and said second relay coil, said first contact being connected in series with said first driving motor and said first power supply, said fourth switch means includes a fourth normally open contact which closes when said indicator and said first element are in the indicating position, said fourth contact being connected in series with said first power supply, said fifth switch means, and said third relay coil.

4. Apparatus according to claim 3 wherein said first driving motor includes means for returning said first element to its starting position when said first driving motor is deenergized.

5. Apparatus according to claim 4 wherein a second indicator is provided at said readout location which is moved on its scale in response to the movement of said second element, said second driving motor includes means for returning said second element to its starting position when said second motor is deenergized, and means is provided for retaining said second indicator in its last position when said second driving motor is returned to its starting position.

UNITED STATES PATENT OFFICE
CERTIFICATE OF CORRECTION

Patent No. 3,594,743　　　　　　　　Dated July 20, 1971

Inventor(s) George D. Rhoades

It is certified that error appears in the above-identified patent and that said Letters Patent are hereby corrected as shown below:

Column 1, line 44 - for "indication", read "indicating".

line 48 - after "provided", insert "for terminating operation of the readout means".

Column 2, line 31 - for "terminal", read "terminals".

Column 3, line 33 - for "indication", read "indicating".

Signed and sealed this 29th day of February 1972.

(SEAL)
Attest:

EDWARD M. FLETCHER, JR.　　　　　ROBERT GOTTSCHALK
Attesting Officer　　　　　　　　　Commissioner of Patents